United States Patent
Cho et al.

(10) Patent No.: US 7,450,909 B2
(45) Date of Patent: Nov. 11, 2008

(54) APPARATUS AND METHOD FOR SIGNAL TRANSMISSION AND RECEPTION USING DOWNLINK CHANNEL INFORMATION IN A SLEEP MODE IN A BWA COMMUNICATION SYSTEM

(75) Inventors: Jae-Weon Cho, Suwon-si (KR); Jung-Je Son, Seongnam-si (KR); Chang-Hoi Koo, Seongnam-si (KR); Pan-Yuh Joo, Seoul (KR); Yeong-Moon Son, Anyang-si (KR); Young-Bin Chang, Hwaseong-si (KR); Chi-Woo Lim, Suwon-si (KR); Hyun-Jeong Kang, Seoul (KR); Sung-Jin Lee, Suwon-si (KR); Hyoung-Kyu Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 463 days.

(21) Appl. No.: 11/266,969

(22) Filed: Nov. 4, 2005

(65) Prior Publication Data
US 2006/0094366 A1    May 4, 2006

(30) Foreign Application Priority Data
Nov. 4, 2004    (KR)    ................ 10-2004-0089489
Nov. 13, 2004    (KR)    ................ 10-2004-0092862

(51) Int. Cl.
*H04B 17/00*    (2006.01)

(52) U.S. Cl. ................ 455/67.11; 455/574; 455/343.2; 455/343.6; 455/450; 455/522; 455/458; 370/311; 370/328; 370/349; 370/350

(58) Field of Classification Search ............. 455/67.11, 455/574, 450, 458, 436, 434, 343.4, 343.5, 455/515, 343.2, 522, 439; 370/343, 349, 370/350, 311, 395.21
See application file for complete search history.

(56) References Cited

U.S. PATENT DOCUMENTS 5,991,635 A * 11/1999 Dent et al. ................ 455/517
6,031,827 A * 2/2000 Rikkinen et al. ........... 370/330
6,047,200 A * 4/2000 Gibbons et al. ............ 455/574

(Continued)

FOREIGN PATENT DOCUMENTS

EP    1 473 880    11/2004

(Continued)

OTHER PUBLICATIONS

Jungje Son et al., Downlink Burst Profile Synchronization for MSS in Sleep Mode, Nov. 4, 2004.

*Primary Examiner*—Marceau Milord
(74) *Attorney, Agent, or Firm*—The Farrell Law Firm

(57) ABSTRACT

An apparatus and method for transmitting and receiving a signal according to a change of downlink channel information by a mobile station in a broadband wireless access communication system. The method includes: detecting the change of the downlink channel information; receiving a report from a base station that there is data for the mobile station; and reporting the change of the downlink channel information to the base station, so that the base station and the mobile station have same downlink channel information.

12 Claims, 5 Drawing Sheets

U.S. PATENT DOCUMENTS

| | | | |
|---|---|---|---|
| 6,192,026 B1* | 2/2001 | Pollack et al. | 370/203 |
| 6,216,019 B1* | 4/2001 | Gibbons et al. | 455/574 |
| 6,262,185 B1* | 7/2001 | Heitz et al. | 525/437 |
| 6,424,645 B1* | 7/2002 | Kawabata et al. | 370/347 |
| 6,463,042 B1* | 10/2002 | Paatelma | 370/318 |
| 6,505,058 B1* | 1/2003 | Willey | 455/574 |
| 6,560,209 B1* | 5/2003 | Alamouti et al. | 370/330 |
| 6,606,296 B1* | 8/2003 | Kokkonen | 370/203 |
| 6,683,866 B1* | 1/2004 | Stanwood et al. | 370/350 |
| 6,744,753 B2* | 6/2004 | Heinonen et al. | 370/338 |
| 6,816,736 B2* | 11/2004 | Laroia et al. | 455/458 |
| 6,853,629 B2* | 2/2005 | Alamouti et al. | 370/330 |
| 6,925,068 B1* | 8/2005 | Stanwood et al. | 370/329 |
| 6,928,062 B2* | 8/2005 | Krishnan et al. | 370/329 |
| 6,934,539 B2* | 8/2005 | Laroia et al. | 455/421 |
| 6,940,827 B2* | 9/2005 | Li et al. | 370/278 |
| 7,013,143 B2* | 3/2006 | Love et al. | 455/450 |
| 7,020,069 B1* | 3/2006 | Pollack et al. | 370/203 |
| 7,054,292 B2* | 5/2006 | Hall et al. | 370/334 |
| 7,236,535 B2* | 6/2007 | Subramaniam et al. | 375/260 |
| 7,260,405 B2* | 8/2007 | Kim et al. | 455/452.2 |
| 7,313,124 B2* | 12/2007 | Lim et al. | 370/342 |
| 7,336,953 B2* | 2/2008 | Kim et al. | 455/438 |
| 7,385,943 B2* | 6/2008 | Niddam | 370/321 |
| 7,406,098 B2* | 7/2008 | Teneja et al. | 370/468 |
| 2002/0025811 A1 | 2/2002 | Willey | |
| 2004/0127163 A1* | 7/2004 | Schramm et al. | 455/67.11 |
| 2004/0176147 A1* | 9/2004 | Escalante | 455/574 |
| 2004/0235536 A1* | 11/2004 | Kim et al. | 455/574 |
| 2005/0049013 A1* | 3/2005 | Chang et al. | 455/574 |
| 2005/0059347 A1* | 3/2005 | Haartsen | 455/41.2 |
| 2005/0070340 A1* | 3/2005 | Kim | 455/574 |
| 2005/0075148 A1* | 4/2005 | Park | 455/574 |

FOREIGN PATENT DOCUMENTS

| | | |
|---|---|---|
| EP | 1564953 | 8/2005 |
| WO | WO 99/16184 | 4/1999 |
| WO | WO 2005/006505 | 1/2005 |
| WO | WO 2005/065056 | 7/2005 |

* cited by examiner

US 7,450,909 B2

APPARATUS AND METHOD FOR SIGNAL TRANSMISSION AND RECEPTION USING DOWNLINK CHANNEL INFORMATION IN A SLEEP MODE IN A BWA COMMUNICATION SYSTEM

PRIORITY

This application claims priority to applications entitled "Apparatus And Method For Signal Transmission/Reception According To Change Of Downlink Channel Information In Sleep Mode In BWA Communication System" filed in the Korean Industrial Property Office on Nov. 4, 2004 and assigned Ser. No. 2004-89489, and on Nov. 13, 2004 and assigned Ser. No. 2004-92862, the contents of which are hereby incorporated by reference.

BACKGROUND OF THE INVENTION

1. Field of the Invention

The present invention relates generally to a Broadband Wireless Access (BWA) communication system, and more particularly to an apparatus and method for signal transmission and reception between a Mobile Station (MS) and a Base Station (BS) when a change occurs in downlink channel information while the MS is in a sleep mode.

2. Description of the Related Art

In a 4$^{th}$ generation (4G) communication system, which is the next generation communication system, research has been pursued to provide users with services having various qualities of service (QoSs) at a high transmission speed. Recently, in the 4G communication system, research has been actively pursued to support high speed services while ensuring mobility and QoS for Broadband Wireless Access (BWA) communication systems such as a wireless local area network (LAN) and a metropolitan area network (MAN) system. A representative communication system designed in order to achieve such goals as described above includes an IEEE (Institute of Electrical and Electronics Engineers) 802.16e communication system.

The IEEE 802.16e communication system utilizes an Orthogonal Frequency Division Multiplexing (OFDM) scheme and an Orthogonal Frequency Division Multiple Access (OFDMA) scheme in order to support a broadband transmission network for a physical channel of the wireless MAN system.

FIG. 1 is a block diagram schematically illustrating a conventional IEEE 802.16e communication system. Referring to FIG. 1, the IEEE 802.16e communication system has a multi-cell structure including a cell 100 and a cell 150. Also, the IEEE 802.16e communication system includes a BS 110 controlling the cell 100, a BS 140 controlling the cell 150, and a plurality of MSs 111, 113, 130, 151, and 153. The transmission and reception of signals between the BSs 110 and 140 and the MSs 111, 113, 130, 151, and 153 is accomplished using an OFDM/OFDMA scheme. Herein, the MS 130 is located in a boundary area, i.e., handover area, between the cell 100 and the cell 150. Accordingly, when the MS 130 moves into the cell 150 controlled by the BS 140 while transmitting and receiving with the BS 110, the serving BS for the MS 130 changes from the BS 110 to the BS 140.

In the IEEE 802.16e communication system, the power consumption of the MS plays an important part in the performance of the entire system. Therefore, a sleep mode operation and an awake mode operation corresponding to the sleep mode operation have been proposed for the BS and the MS in order to minimize the power consumption of the MS. Further, in order to cope with a channel state change between the MS and the BS, the MS periodically performs ranging for adjusting the timing offset, the frequency offset, and the transmit power between the BS and the MS.

Hereinafter, an operation for downlink burst profile allocation in a typical IEEE 802.16a communication system will be described.

First, when the MS is powered on, the MS monitors all frequency bands set in advance in the MS and detects a pilot signal having a largest intensity, i.e., a largest Carrier to Interference and Noise Ratio (CINR). Further, the MS determines a BS transmitting the pilot signal having the largest CINR as the serving BS, which is a BS to which the MS currently belongs. Then, the MS receives a preamble of a downlink frame transmitted from the serving BS and acquires system synchronization between the MS and the serving BS.

When the MS synchronizes to the serving BS, the serving BS transmits a DL(Downlink)_MAP message and a UL(Uplink)_MAP message to the MS. The DL_MAP message has a message format as shown in Table 1 below.

TABLE 1

| Syntax | Size | Notes |
|---|---|---|
| DL_MAP_Message_Format ( ) { | | |
|   Management Message Type=2 | 8 bits | |
|   PHY Synchronization Field | Variable | See Appropriate PHY specification |
|   DCD Count | 8 bits | |
|   Base Station ID | 48 bits | |
|   Number of DL_MAP Element n | 16 bits | |
|   Begin PHY Specification section{ | | See Applicable PHY section |
|     for (i=1; i<=n; i++) | | For each DL_MAP element 1 to n |
|   DL_MAP Information Element( ) | Variable | See corresponding PHY specification |
|     If !(byte boundary) { | 4 bits | Padding to reach byte boundary |
|     Padding Nibble | | |
|     } | | |
|   } | | |
|   } | | |
| } | | |

As shown in Table 1, the DL_MAP message contains a plurality of Information Elements (IEs), such as 'Management Message Type' representing a type of a message being currently transmitted, 'PHY synchronization' set correspondingly to the modulation scheme and demodulation scheme applied to a physical (PHY) channel for acquisition of synchronization, 'DCD count' representing a count corresponding to changes in a configuration of a Downlink Channel Descriptor (DCD) message including a downlink burst profile, 'Base Station ID' representing a BS identifier, and 'Number of DL_MAP Elements n' representing the number of the elements following the 'Base Station ID'. The DL_MAP message in Table 1 contains n number of DL_MAP IEs, each of which includes a Downlink Interval Usage Code (DIUC) that has a value mapped to a downlink burst profile included in the DCD message. That is, the MS can detect information about the coding scheme (Forward Error Correction (FEC) code type) and modulation scheme applied to downlink bursts included in the downlink frame by extracting the DIUC value from the DL_MAP message. Accordingly, the MS can receive the data (data frame) in the downlink burst while identifying the downlink bursts in the downlink frame.

When movement of the MS occurs or a change in the surrounding channel conditions of the MS causes change in the CINR value of the pilot signal received by the MS from the serving BS, it is necessary to also change the DIUC value applied to the data to be transmitted by the MS, correspondingly to the change in the CINR value of the pilot signal.

Further, when it is necessary for the BS to change the downlink burst profile, the BS changes the burst profile and then transmits a DCD message including the information about the change to the MS. Then, by receiving the DCD message, the MS can recognize the change in the downlink burst profile from the DCD message.

However, when the downlink burst profile changes, i.e., the DCD message changes, while the MS is in a sleep mode, the MS cannot recognize the change of the DCD message in realtime because the MS is in the sleep mode.

FIG. 2 schematically illustrates an operation of an MS when the DCD message changes while the MS is in a sleep mode in a conventional IEEE 802.16e communication system. In FIG. 2, the MS and the BS set up protocols about transmissible and receivable modulation schemes and coding schemes in advance for signal transmission and reception between them. The setup of protocols about the modulation schemes and coding schemes is achieved through transmission and reception of the downlink burst profile, i.e. transmission and reception of the DCD message.

Further, it is necessary to prepare protocols about the modulation schemes and coding schemes between the BS and the MS in order to enable the MS to normally restart data transmission/reception after awakening from the sleep mode.

However, because the MS does not receive any signal from the BS at all during the sleep interval in which the MS stays in the sleep mode, the MS cannot recognize any change in the downlink burst profile, i.e., DIUC set, made by the BS in the sleep interval. When the DIUCs used by the MS and the BS do not coincide due to the sleep mode operation of the MS, it is impossible to transmit and receive data between the MS and the BS.

Hereinafter, different scenarios in which the DIUCs used by the MS and the BS no longer coincide due to the sleep mode operation of the MS will be discussed.

The first case corresponds to when the DCD message changes while the MS performs the sleep mode operation, i.e., while the MS stays in the sleep interval.

In the IEEE 802.16e communication system, the MS detects the DCD count included in the currently received DL_MAP message and compares the detected value with the DCD count value currently stored in the MS itself. If the DCD count value included in the DL_MAP message currently received by the MS and the DCD count value currently stored in the MS are different, the MS recognizes the change of the DCD message. That is, because the DCD count values are different, the version numbers of the downlink burst profiles are different. Therefore, the MS can recognize the version number of the downlink burst profile using the DCD count value.

However, in the current IEEE 802.16e communication system, it is impossible to notify the change in the downlink burst profile to an MS that has awakened from the sleep mode. Therefore, if the BS transmits downlink data to the MS using the downlink burst profile of the BS itself, without recognizing that the downlink burst profile of the BS is different from the downlink burst profile stored in the MS, the MS cannot normally receive the downlink data.

The scenario above will be described in more detail hereinafter with reference to FIG. 2.

First, however, it is noted that FIG. 2 is based on an assumption that the parameter denoting the DCD count value managed by the BS 200 is N, the parameter denoting the DCD count value managed by the MS 250 is M, and the two parameters N and M have an initial value of '0'. When the BS 200 detects that it is necessary to change the downlink burst profile while the MS 250 stays in the sleep mode, i.e. in the sleep interval, the BS sets the DCD count value N, which is managed by the BS 200, to be '1' (N=1) in step 211 and transmits the changed DCD message in step 213. Although the BS 200 transmitted the changed DCD message, the MS 250 in the sleep interval cannot recognize the change of the DCD message. Therefore, the MS 250 maintains the value '0' (M=0) of the parameter denoting the DCD count value, which is managed by the MS 250 itself, in step 215.

When the sleep interval terminates, the MS 250 receives the DL_MAP message from the BS 200 in the listening interval in step 217. In the DL_MAP message, the DCD count value, more specifically, the value of the parameter N representing the DCD count value managed by the BS 200, is set as '1'. Therefore, the MS 250 recognizes from the DCD count value that it is necessary to receive a new DCD message from the BS 200.

After the listening interval terminates, the MS 200 mode-transits into the awake mode and waits for the DCD message in step 219. When the BS 200 detects occurrence of a data targeting the MS 250 while the MS 250 stays in the awake mode, the BS 200 transmits to the MS 250 a TRF_IND message indicating that there is a data to be transmitted targeting the MS 250, i.e. a TRF_IND message in which a bit representing the MS 250 in a sleep identifier bitmap is marked by a positive value, i.e., '1', in step 221.

After transmitting the TRF_IND message, the BS 200 transmits data to the MS 250 in step 223. However, as described above, although the BS 200 transmits the data using the newly changed downlink burst profile, the MS 250 still uses the downlink burst profile before the change. As a result, the DIUC value applied to the data transmitted from the BS 200 to the MS 250 is different from the DIUC value stored in the MS 250, and the MS 250 cannot normally demodulate the data transmitted from the BS 200 in step 225.

As described above, in the first scenario, the DIUCs used by the MS and the BS become different, i.e., no longer coincide, due to change of the DCD message while the MS performs the sleep mode operation, i.e., while the MS stays in the sleep interval.

However, as will be described below, in the second scenario, the DIUCs used by the MS and the BS become different due to the sleep mode operation of the MS because the MS itself changes the DIUC value to be proper for the MS while the MS performs the sleep mode operation, i.e., while the MS stays in the sleep interval.

More specifically, when the MS moves while it is in the sleep interval or when the surrounding channel condition of the MS changes to make the CINR value of the pilot channel signal from the serving BS become different from that before the MS mode-transits into the sleep mode, the MS changes the DIUC value to be most proper for the MS itself. For example, when the CINR value of the pilot channel signal measured, while the MS stays in the sleep interval, becomes smaller than the CINR value of the pilot channel signal measured before the MS comes into the sleep interval, if the MS transmits data to the BS using the existing DIUC value without update, it is highly possible that the data transmitted by the MS has an error.

As described above, in the current IEEE 802.16e communication system, if the DCD message changes while the MS is in the sleep mode, it is impossible to normally perform data transmission and reception, thereby causing data loss. The data loss may degrade the general performance of the IEEE 802.16e communication system targeting a high speed data transmission. Therefore, a need exists for a solution for data transmission and reception reflecting the DCD message change in realtime.

SUMMARY OF THE INVENTION

Accordingly, the present invention has been designed to solve the above and other problems occurring in the prior art. An object of the present invention is to provide a system and a method for signal transmission and reception when the downlink channel information changes in a sleep mode of a broadband wireless access communication system.

It is another object of the present invention to provide a system and a method for reporting a change of downlink channel information from an MS to a BS when the downlink channel information changes in a sleep mode of a broadband wireless access communication system.

It is another object of the present invention to provide a system and a method for requesting a change of downlink channel information from an MS to a BS when the downlink channel information changes in a sleep mode of a broadband wireless access communication system.

In order to accomplish the above and other objects, there is provided an apparatus for transmitting and receiving a signal according to a change of downlink channel information in a broadband wireless access communication system. The apparatus includes: a mobile station for detecting the change of the downlink channel information, receiving a report there is a data which the mobile station must receive, and reporting the change of the downlink channel information; and a base station for changing the downlink channel information and transmitting the changed downlink channel information including information reporting change of the downlink channel information to the mobile station, reporting existence of data to be transmitted to the mobile station, matching the downlink channel information of the base station and the mobile station with each other through a predetermined scheme, and transmitting data to the mobile station using the matching downlink channel information, when the base station receives a report of the change of the downlink channel information from the mobile station.

In accordance with another aspect of the present invention, there is provided a method for transmitting and receiving a signal according to a change of downlink channel information by a mobile station in a broadband wireless access communication system. The method includes the steps of: detecting the change of the downlink channel information; receiving a report from a base station that there is data for the mobile station to receive; reporting the change of the downlink channel information to the base station, thereby indicating that the base station and the mobile station have the same downlink channel information.

In accordance with another aspect of the present invention, there is provided a method for transmitting and receiving a signal according to a change of downlink channel information by a base station in a broadband wireless access communication system. The method includes the steps of: changing the downlink channel information; transmitting the changed downlink channel information including information reporting change of the downlink channel information to a mobile station; reporting existence of data to be transmitted to the mobile station; matching the downlink channel information of the base station and the mobile station coincide with each other through one of a first predetermined scheme and a second predetermined scheme; and transmitting the data to the mobile station using the matching downlink channel information, when the base station receives a report of the change of the downlink channel information from the mobile station.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, a detailed description of known functions and configurations incorporated herein will be omitted when it may obscure the subject matter of the present invention.

The present invention proposes a scheme for signal transmission and reception by a Mobile Station (MS) according to a change of downlink channel information in an Institute of Electrical and Electronics Engineers(IEEE) 802.16e communication system, which is a Broadband Wireless Access (BWA) communication system. That is, the present invention proposes a scheme for signal transmission and reception using a same Downlink Interval Usage Code (DIUC) between the BS and the MS by reporting the change of a Downlink Channel Descriptor(DCD) message, i.e., the change of the DCD count value, from the MS to the BS, when the DCD message changes while the MS is in the sleep mode in the IEEE 802.16e communication system.

Also, the present invention proposes a scheme for reliable signal transmission and reception between the BS and the MS through realtime request for change of the DIUC from the MS to the BS, when Carrier to Interference and Noise Ratio (CINR) value of a reference signal, e.g., the pilot channel signal, measured while the MS is in the sleep interval becomes smaller than the CINR value of the reference signal measured before the MS entered the sleep mode in the IEEE 802.16e communication system.

The IEEE 802.16e communication system is a BWA communication system using an Orthogonal Frequency Division Multiplexing (OFDM) scheme and an Orthogonal Frequency Division Multiple Access (OFDMA) scheme, in which physical channel signals are transmitted by a plurality of sub-carriers to achieve high speed data transmission and a multi-cell structure is used to support the mobility of the MS. Although the IEEE 802.16e communication system is used herein as an embodiment of the present invention, it noted that the present invention can be applied to any communication system supporting a sleep mode operation.

Figure 3:
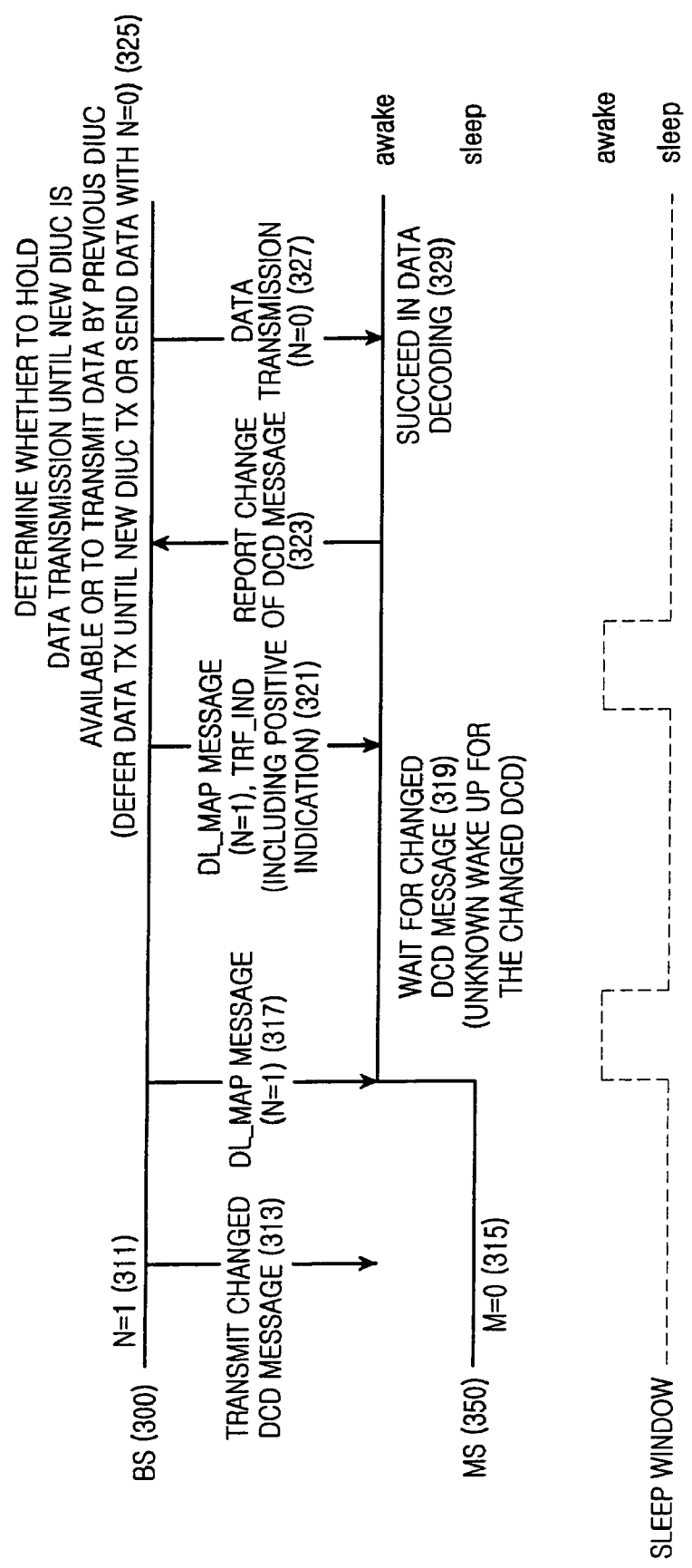
FIG. 3 schematically illustrates an operation of an MS when a DCD message changes while the MS operates in a sleep mode in an IEEE 802.16e communication system according to an embodiment of the present invention.

FIG. 3 schematically illustrates an operation of an MS when a DCD message changes while the MS operates in a sleep mode in an IEEE 802.16e communication system according to an embodiment of the present invention.

Figure 1:
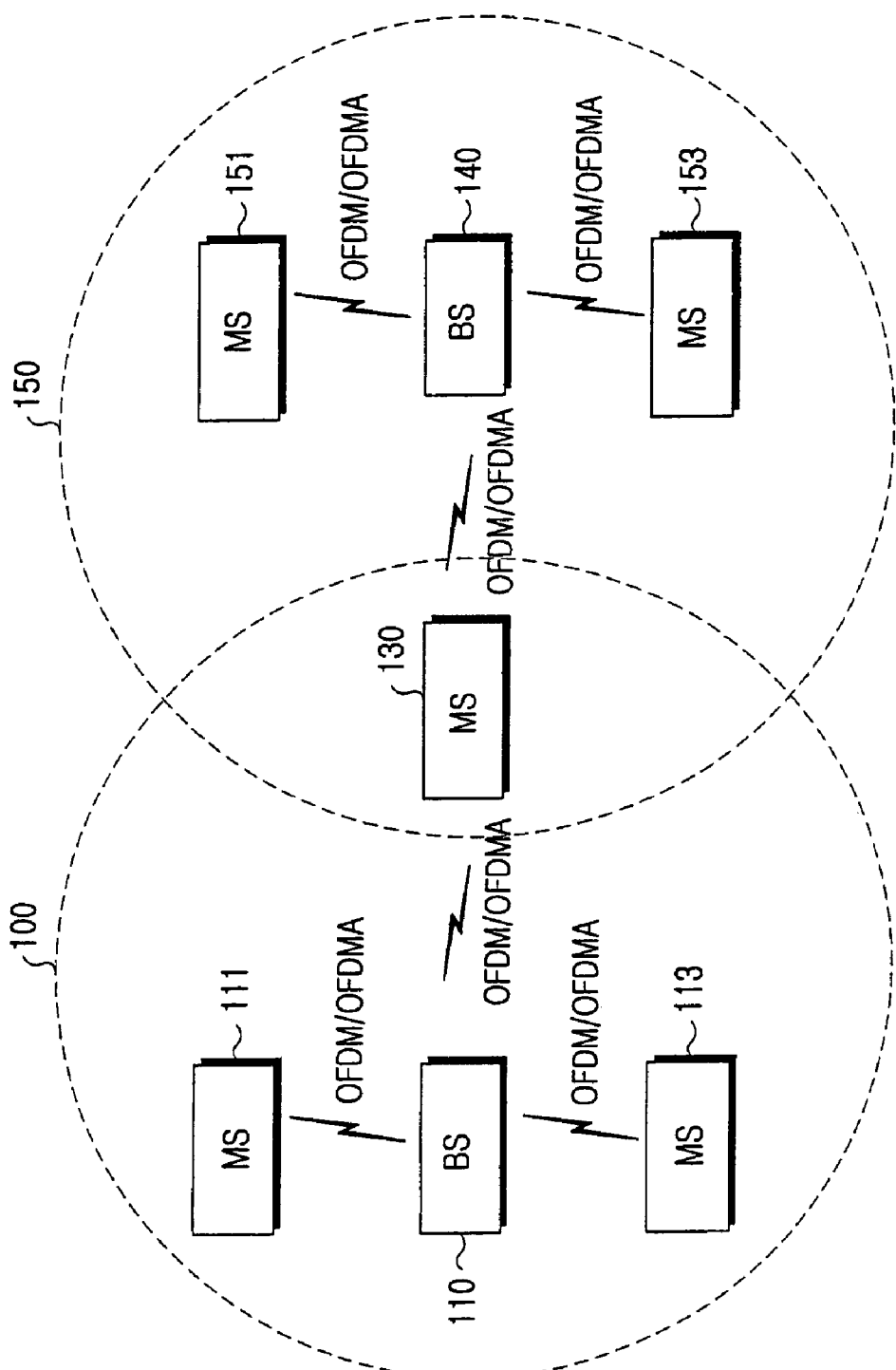
FIG. 1 is a block diagram schematically illustrating a conventional IEEE 802.16e communication system.
Figure 2:
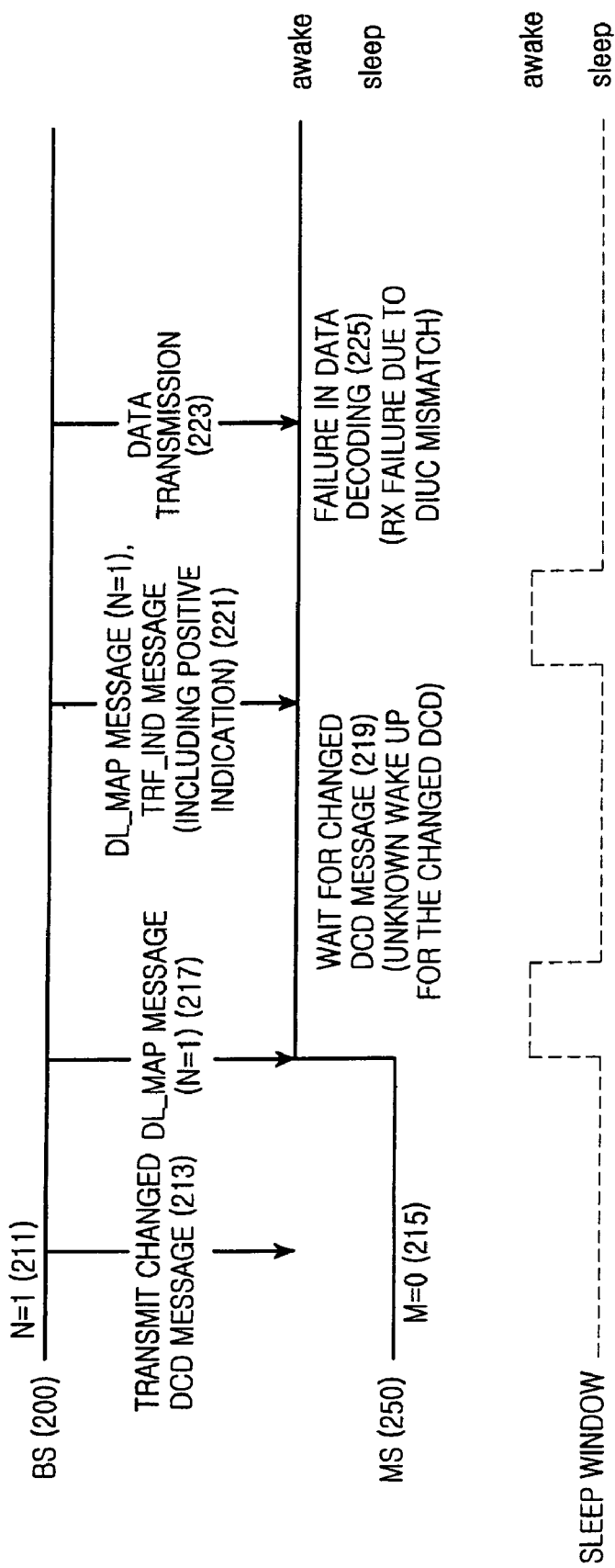
FIG. 2 schematically illustrates an operation of an MS when a DCD message changes while the MS is in a sleep mode in a conventional IEEE 802.16e communication system.

As described in FIGS. 1 and 2, the MS and the BS set up protocols about transmissible and receivable modulation schemes and coding schemes in advance for signal transmission/reception between them. The setup of protocols about the modulation schemes and coding schemes is achieved through transmission and reception of the downlink burst profile, i.e., transmission and reception of the DCD message. Further, it is necessary to prepare protocols about the modulation schemes and coding schemes between the BS and the MS, in order to enable the MS to normally restart data transmission and reception after awakening from the sleep mode. However, because the MS does not receive any signal from the BS at all during the sleep interval in which the MS stays in the sleep mode, the MS cannot recognize any change in the downlink burst profile, i.e., DIUC set, made by the BS in the sleep interval. When the DIUCs used by the MS and the BS no longer coincide due to the sleep mode operation of the MS, it is not possible to transmit and receive data between the MS and the BS.

That is, when the DCD message changes while the MS performs a sleep mode operation, i.e., the MS is in the sleep interval, the MS detects the DCD count included in the currently received DL_MAP message and compares the detected value with the DCD count value currently stored in the MS itself in the IEEE 802.16e communication system. If the DCD count value included in the DL_MAP message currently received by the MS and the DCD count value currently stored in the MS are different, the MS recognizes the change of the DCD message. That is, because the DCD count values are different, the version numbers of the downlink burst profiles are different. Therefore, the MS recognizes the version number of the downlink burst profile using the DCD count value.

As described above, in the current IEEE 802.16e communication system, it is impossible to notify the change in the downlink burst profile to the MS that has awakened from the sleep mode. Therefore, if the BS transmits downlink data to the MS using the downlink burst profile of the BS itself, without recognizing that the downlink burst profile of the BS is different from the downlink burst profile stored in the MS, the MS cannot normally receive the downlink data from the BS.

Therefore, the present invention proposes a scheme for data transmission and reception between the MS and the BS using a DIUC that is updated to be the same when the DCD message changes, which will be described hereinafter with reference to FIG. 3.

First, however, it is noted that FIG. 3 is based on an assumption that the parameter denoting the DCD count value managed by the BS 300 is N, the parameter denoting the DCD count value managed by the MS 350 is M, and the two parameters N and M have an initial value of '0'. When the BS 300 detects that it is necessary to change the downlink burst profile while the MS 350 is in the sleep mode, i.e., during a sleep interval, the BS updates the DCD count value N, which is managed by the BS 300, to '1' (N=1) in step 311 and transmits the changed DCD message in step 313. Although the BS 300 transmitted the changed DCD message, the MS 350 in the sleep interval cannot recognize the change of the DCD message. Therefore, the MS 350 maintains the value '0' of the parameter M (M=0) denoting the DCD count value, which is managed by the MS 350, in step 315.

When the sleep interval terminates, the MS 350 receives the DL_MAP message from the BS 300 in the listening interval in step 317. In the DL_MAP message, the DCD count value, more specifically, the value of the parameter N representing the DCD count value, which is managed by the BS 300, is set as '1'. Therefore, the MS 350 recognizes from the DCD count value that it is necessary to receive a new DCD message from the BS 300.

After the listening interval terminates, the MS 300 transitions to the awake mode and waits for the DCD message in step 319. When the BS 300 detects data targeting the MS 350, while the MS 350 is in the awake mode, the BS 300 transmits to the MS 350 a TRF_IND message indicating that there is data to be transmitted targeting the MS 350, i.e. a TRF_IND message in which a bit representing the MS 350 in a sleep identifier bitmap is marked by a positive value, i.e., '1', in step 321.

After receiving the TRF_IND message, the MS 350 reports to the BS 300 that it has recognized the change of the DCD message, i.e., the change of the DCD count value, in step 323. In this step, the MS 350 uses a Medium Access Control (MAC) header message in reporting the change of the DCD count value to the BS 300. The operation for reporting the change of the DCD count value by the MS 350 will be described later in more detail.

Upon receiving the report about the change of the DCD count value from the MS 350, the BS recognizes that the MS 350 still applies the DCD message before the change, i.e., the DCD message having a DCD count value of '0', and the BS then selects one of the two following schemes in order to solve the problem due to the difference between the DCD count values of the BS 300 and the MS 350. That is, in order to prevent abnormal data transmission and reception due to the difference between the DIUC values the BS then selects one of the two following schemes in step 325. Thereafter, the BS 300 transmits data to the MS 350 by using the selected scheme in step 327.

In a first scheme, the BS 300 holds data transmission to the MS 350, until the MS 350 receives the new DCD message, i.e., until the BS 300 broadcasts the new DCD message, after receiving the report about the change of the DCD count value. That is, according to the first scheme, the BS 300, having received the new DCD message, performs data transmission and reception after updating the DIUC of the MS 350 to be the same as that of the BS 300.

According to a second scheme, the BS 300 performs data transmission and reception by applying the DCD count value currently stored in the MS 350, i.e., by using a DIUC corresponding to the DCD count value currently stored in the MS 350. FIG. 3 illustrates a case in which the BS 300 transmits data to the MS 350 according to the second scheme.

The second case in which the MS and the BS use different DIUCs due to the sleep mode operation of the MS corresponds to when the MS changes the DIUC value to be proper for the itself in the sleep mode operation, i.e., while the MS is in the sleep interval.

When the MS moves while it is in the sleep interval or when the surrounding channel conditions of the MS change to make the CINR value of the pilot channel signal from the BS differ from that before the MS entered into the sleep mode, the MS changes the DIUC value to be proper for the MS itself. For example, when the CINR value of the pilot channel signal measured while the MS is in the sleep interval becomes smaller than the CINR value of the pilot channel signal measured before the MS entered into the sleep interval, if the MS transmits data to the BS using the existing DIUC value without an update, it is highly possible that the data transmitted by the MS has an error. Therefore, the present invention enables the MS to request an update of the DIUC of the MS, even when the MS is in the sleep mode, in order to match the DIUC of the MS and the BS, thereby enabling a normal data transmission and reception.

More specifically, according to the present invention, a MAC header message reporting change of the DCD count value is used to request the update of the DIUC of the MS. A MAC header message for reporting a change of the DCD count value and requesting change of the DIUC value of the MS will be described in more detail herein below.

First, the MAC header message proposed by the present invention for reporting a change of the DCD count value and requesting the update of the DIUC of the MS is determined as one of the following three types.

The first type of MAC header message is a message generated based on the MAC header message used in the current IEEE 802.16e communication system. The first type of MAC header message reports the change in the DCD count value using the two unused and reserved bits in the MAC header message, i.e., physical (PHY) channel report header, of the current IEEE 802.16e communication system. The first type of MAC header message has a format as shown in Table 2 below.

TABLE 2

| HT = 1 (1) | EC = 0 (1) | TYPE = 010 (3) | PREFERENCE-DIUC (4) | UP-TX-POWER (7) |
|---|---|---|---|---|
| UL-HEADROOM (6) | | DCD CHANGE COUNT LSB (2) | CID MSB (8) | |
| CID LSB (8) | | HCS (8) | | |

As noted from Table 2, all fields except for the DCD CHANGE COUNT LSB (Least Significant Bit) field in the first type of MAC header message are the same as the fields of the PHY channel report header message of the current IEEE 802.16e communication system. In Table 2, 'HT' is a field indicating the header type, 'EC' is a field indicating the Encryption control and always has a value of '0' in the PHY channel report header message, and 'TYPE' is a field indicating the type of the currently transmitted MAC header message. When 'TYPE' is marked by '010', it implies that the MAC header message is the PHY channel report header message.

In Table 2, 'PREFERENCE-DIUC' is a field indicating the DIUC value requested by the MS, 'UL-TX-POWER' is a field indicating extra transmit power available for the MS, 'DCD CHANGE COUNT LSB' is a field indicating an LSB of the count value of the changed DCD message, 'CID' indicates the basic connection identifier of the MS, and 'HCS' is a field indicating the header check sequence.

The first type MAC header message is a MAC header message generated by changing the reserved bits of the PHY channel report header message of the current IEEE 802.16e communication system into the field 'DCD CHANGE LSB', which reports the change of the DCD count value. The two reserved bits currently unused in the PHY channel report header message of the current IEEE 802.16e communication system are used as two LSB bits of the DCD count defining the DIUC (PREFERENC-DIUC) requested by the MS in the first type MAC header message. The first type MAC header message includes both 'PREFERENC-DIUC' and 'DCD CHANGE COUNT LSB' by which the MS can report the change of the DCD count and the change of the DIUC to the BS.

The second type of MAC header message is the 'Bandwidth Request and Downlink Burst Profile Change Request Header' message, which is a newly generated message in order to report the change of the DCD count value and request the change of the DIUC of the MS.

The second type of MAC header message has a format as shown in Table 3 below.

TABLE 3

| HT = 1 (1) | EC = 0 (1) | TYPE = 100 (3) | BR (11) |
|---|---|---|---|
| Requested Downlink Burst Profile (8) | | CID MSB (8) | |
| CID LSB (8) | | HCS (8) | |

In Table 3, the 'HT', 'EC', 'HCS', and 'CID' fields of the second type MAC header message are the same as the 'HT', 'EC', 'HCS', and 'CID' fields of the first type MAC header message as shown in Table 2, so repetition of the description about them will be avoided.

In Table 3, 'TYPE' is a field indicating the type of the currently transmitted MAC header message. When 'TYPE' is marked by '100', it implies that the MAC header message is the Bandwidth Request and Downlink Burst Profile Change Request Header message. Further, the 'BR' field indicates the bandwidth requested by the MS, which has a value of '0' when there is no data, which the MS must transmit through the uplink. The 'Requested Downlink Burst Profile' field has a length of 8 bits, among which four bits from the $0^{th}$ bit to the $3^{rd}$ bit represent the DIUC value requested by the MS and four bits from the $4^{th}$ bit to the $7^{th}$ bit represent the four LSB bits of the DIUC-defining DCD count requested by the MS. The 'Requested Downlink Burst Profile' has a format as shown in Table 4 below.

TABLE 4

| Name | Type (1 byte) | Length | Value |
|---|---|---|---|
| Request Downlink Burst Profile | 1 | 1 | Bits 0-3: DIUC of the downlink burst profile requested by the MS for downlink traffic<br>Bits 4-7: LDB of Configuration Change Count value of DCD defining the burst profile associated with DIUC |

The second type MAC header message includes the 'Requested Downlink Burst Profile' field by which the MS can report the change of the DCD count and the change of the DIUC to the BS.

The third type of MAC header message is the 'Bandwidth Request and Downlink Burst Profile Change Request Header' message, which is a newly generated message in order to report the change of the DCD count value and request the change of the DIUC of the MS.

The third type of MAC header message has a format as shown in Table 5 below.

TABLE 5

| HT = 1 (1) | EC = 0 (1) | TYPE = 100 (3) | BR (11) |
|---|---|---|---|
| CINR (7) | DCD Change Indication (1) | CID MSB (8) | |
| CID LSB (8) | | HCS (8) | |

In table 5, the 'HT', 'EC', 'HCS', and 'CID' fields of the third type MAC header message as shown in Table 5 are the same as the 'HT', 'EC', 'HCS', and 'CID' fields of the first type MAC header message as shown in Table 2, so repetition of the description about them will be avoided.

In Table 5, 'TYPE' is a field indicating the type of the currently transmitted MAC header message. When 'TYPE' is marked by '100', it implies that the MAC header message is the Bandwidth Request and Downlink Burst Profile Change Request Header message. Although the message types of the second type MAC header message and the third type MAC header message may be different from each other, they are set as the same in the present embodiment for ensuring clarity and convenience for the description.

In Table 5, the 'BR' field indicates the bandwidth requested by the MS, which has a value of '0' when there is no data, which the MS must transmit through the uplink. Further, the 'CINR' field indicates a CINR of a downlink signal, e.g., a pilot channel signal, received by the MS, and the 'DCD Change Indication' field indicates if the DCD count has changed.

As shown in Table 5, the third type MAC header message has a format similar to that of the second type MAC header message. That is, same as the second type MAC header message, the third type MAC header message is a message indicating Bandwidth Request and Downlink Burst Profile Change Request. However, the second type MAC header message and the third type MAC header message are different in the process of requesting the change of the downlink burst profile.

Hereinafter, the ways in which the second type MAC header message and the third type MAC header message request the change of the downlink burst profile will be described.

First, the second type MAC header message is used by the MS, which directly requests allocation of a DIUC value that is proper for the MS from the BS, in order to change the DIUC value when movement of the MS during the sleep interval or change of surrounding channel conditions causes the CINR of the pilot channel signal from the BS to become different from the CINR before the transition of the MS into the sleep mode. Therefore, in the second type MAC header message, the four bits from the $0^{th}$ bit to the $3^{rd}$ bit from among the eight bits of the 'Requested Downlink Burst Profile' field are used in order to express the DIUC value requested by the MS.

In contrast, the third type MAC header message is used by the MS in order to request allocation of a DIUC value proper for the MS by reporting a CINR of a received pilot channel signal, instead of being used by the MS, which directly requests allocation of a DIUC value that is proper for the MS from the BS, in order to change the DIUC value when movement of the MS during the sleep interval or change of surrounding channel conditions causes the CINR of the pilot channel signal from the BS to become different from the CINR before the transition of the MS into the sleep mode. Therefore, the third type MAC header message includes the CINR field for reporting the CINR of the pilot channel signal received by the MS. In order to report the channel quality of the MS, the third type MAC header message may include the CINR and also other information capable of expressing the channel quality of the MS.

Further, in order to report the change of the DCD count value, the second type MAC header message directly transmits the DCD count value stored in the MS to the BS using the four bits from the $4^{th}$ bit to the $7^{th}$ bit from among the eight bits of the 'Requested Downlink Burst Profile' field.

In contrast, the third type MAC header message uses a DCD change indication field in order to express the change of the DCD count value. That is, when the DCD count value currently stored in the MS is different from the DCD count value received by the MS in the listening interval, the value of the DCD change indication field is set as '1'. When the DCD count value currently stored in the MS is equal to the DCD count value received by the MS in the listening interval, the value of the DCD change indication field is set as '0'. Therefore, the BS can recognize if the DCD count value has changed from the value of the DCD change indication field of the third type MAC header message.

The time point at which the third type MAC header message is transmitted is to the same as the time point at which the first type MAC header message and second type MAC header message are transmitted. That is, when the DCD count value currently stored in the MS is different from the DCD count value of the DCD message received by the MS in the listening interval or when it is necessary to change the DIUC value due to the change of the CINR of the downlink signal received by the MS, the MS transmits the third type MAC header message.

Further, even when the DCD count value currently stored in the MS is equal to the DCD count value of the DCD message received by the MS in the listening interval and it is unnecessary to change the DIUC value in consideration of the CINR of the downlink signal received by the MS, the MS may use the third type MAC header message for confirmation of the TRF_IND message.

When the MS reports its CINR value through the third type MAC header message to the BS, the BS determines the DIUC value proper for the MS in accordance with the CINR value of the MS. The process in which the BS determines the DIUC value proper for the MS in accordance with the CINR value of the MS will not be described here, because it has no direct relation to the present invention.

Further, when the MS reports a change of the DCD count value through the third type MAC header message to the BS, that is, when the MS transmits the third type MAC header message containing a DCD change indication field having a value set as '1', the BS holds transmission of traffic data targeting the MS until the MS receives a DCD message corresponding to the changed DCD count value, that is, until the BS retransmits the DCD message corresponding to the changed DCD count value.

Also, even before the BS retransmits the DCD message corresponding to the changed DCD count value, if the BS has continuously managed and recognizes the DCD count value of the DCD message stored in the MS, the BS may transmit the traffic data targeting the MS using the DIUC defined in the DCD message corresponding to the DCD count value stored in the MS.

Accordingly, different from the first type MAC header message and the second type MAC header message, the third type MAC header message enables the MS to directly report the received CINR of the downlink signal to the BS. Therefore, the BS can exactly determine the DIUC for the MS and also the quantity of power to be transmitted to the MS, the number of repetition of data coding, etc.

Hereinafter, the MAC header messages newly proposed by the present invention, including the first type MAC header message as shown in Table 2, i.e., a message created by modifying the PHY channel report header message used in the current IEEE 802.16e communication system, the second type MAC header message, and the third type MAC headers message will be compared with each other.

The first type MAC header message is advantageous in that it is a reused message that is created by modifying the PHY channel report header message used in the current IEEE 802.16e communication system. However, while the first type MAC header message can transmit 2 LSB bits of the DCD count, the second type MAC header message can transmit 4 LSB bits of the DCD count. Therefore, the second type MAC header message is more proper than the first type MAC header message, when the MS stays in the sleep mode for relatively long time and the DCD message changes relatively frequently.

Further, the second type MAC header message and the third type MAC header message can be used to simultaneously perform a downlink burst profile change confirmation and bandwidth allocation request. That is, even while the MS is in the sleep mode, the MS can request a bandwidth request through an uplink to the BS if a data to be transmitted to the BS occurs. Then, the MS can simultaneously perform downlink burst profile change confirmation and bandwidth allocation request using the second type MAC header message and the third type MAC header message. By simultaneously performing a downlink burst profile change confirmation and bandwidth allocation request, it is possible to minimize the uplink signaling load.

Figure 4:
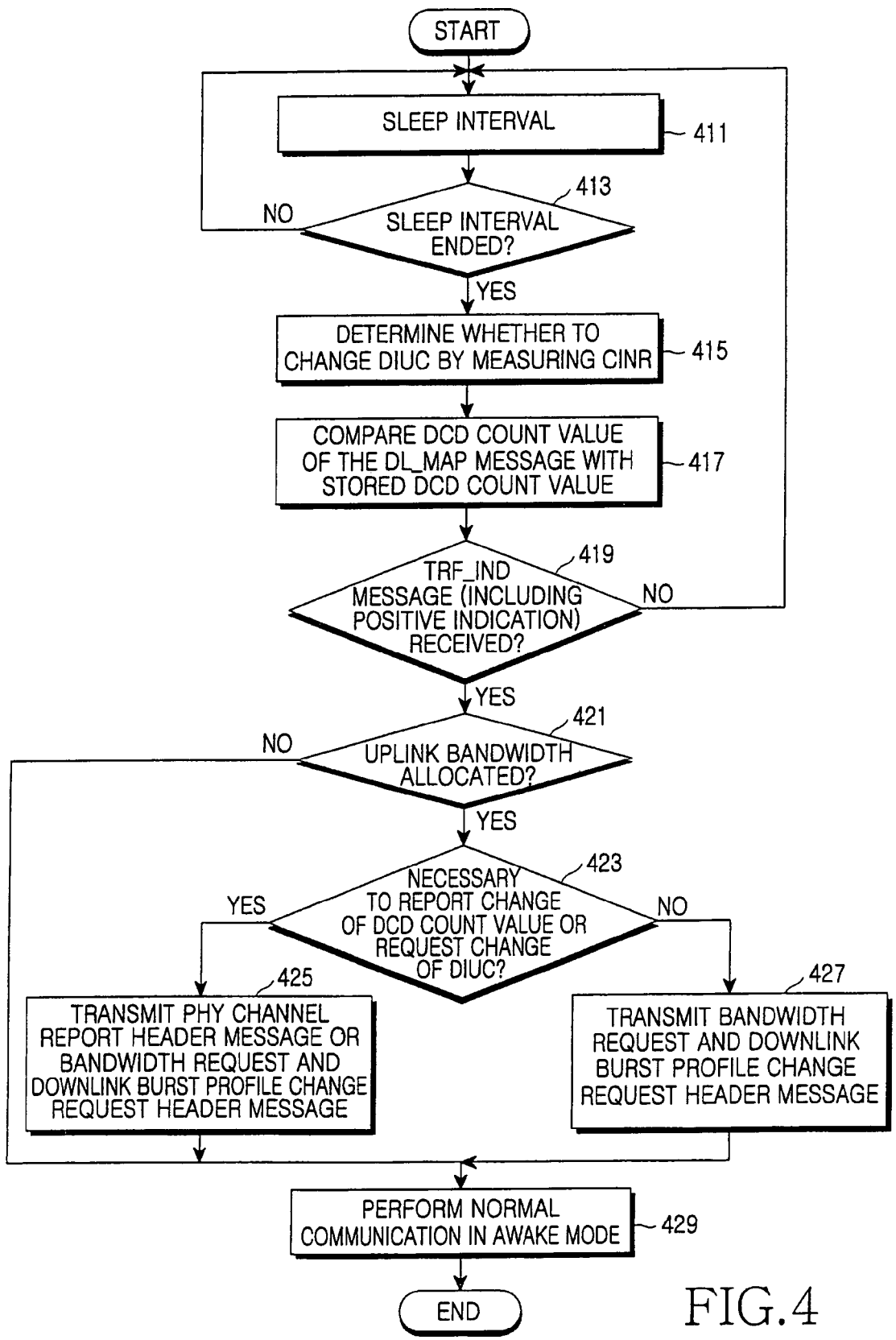
FIG. 4 is a flowchart of an operation process by an MS in an IEEE 802.16e communication system according to an embodiment of the present invention.

FIG. 4 is a flowchart of an operation process by an MS in an IEEE 802.16e communication system according to an embodiment of the present invention.

As described above, the second type MAC header message and the third type MAC header message are similar in their functions, that is, they are both 'Bandwidth Request and Downlink Burst Profile Change Request Header' messages. Therefore, it should be noted that one of the second type MAC header message and the third type MAC header message can be selectively used as the 'Bandwidth Request and Downlink Burst Profile Change Request Header' message in the following description of FIG. 4.

Referring to FIG. 4, while the MS is in the sleep mode in step 411, the MS checks if the sleep interval terminates in step 413. When the sleep interval has not terminated yet, the MS remains in the sleep interval in step 411.

When the sleep interval ends, the MS enters into a listening interval. In step 415, the MS receives a pilot channel signal from a serving BS, measures a CINR of the pilot channel signal, and determines from the measured CINR if it is necessary to change the DIUC of the MS itself.

In step 417, the MS compares the DCD count value of the DL_MAP message from the BS with the DCD count value stored in the MS and determines if the DCD count value has changed. In step 419, the MS receives a TRF_IND message from the BS and checks if the bit for the MS in the sleep identifier bitmap of the received TRF_IND message is marked by a value representing a positive indication, i.e., '1'. When the bit is not marked by '1', the MS returns to step 411.

As a result of the checking in step 419, when the bit is marked by '1', the MS checks if the MS has been allocated an uplink bandwidth in step 421. The MS proceeds to step 423, when the MS has been allocated an uplink bandwidth, and proceeds to step 429, when the MS has not been allocated an uplink bandwidth.

In step 423, the MS checks if it is necessary to report change of the DCD count value or request change of the DIUC. When it is necessary to report change of the DCD count value or request change of the DIUC, the MS selects one MAC header message from among the first type MAC header message, i.e., PHY channel report header message, and the second and third type MAC header messages, i.e., Bandwidth Request and Downlink Burst Profile Change Request Header messages, reports change of the DCD count value or requests change of the DIUC by using the selected message in step 425. In step 425, the MS obeys the determination of the IEEE 802.16e communication system in selecting one MAC header message from among the first, second, and third type MAC header messages.

When it is unnecessary to report change of the DCD count value and request change of the DIUC, the MS may transmit the 'Bandwidth Request and Downlink Burst Profile Change Request Header' message instead of the 'Bandwidth Request Header' message after setting the 'BR' field of the Bandwidth Request and Downlink Burst Profile Change Request Header message as '0' in step 427.

In step 429, the MS transits from the sleep mode to an awake mode and then performs a normal operation.

As described above, the second type MAC header message and the third type MAC header message are similar in their functions, that is, they are 'Bandwidth Request and Downlink Burst Profile Change Request Header' messages. Therefore, it should be noted that one of the second type MAC header message and the third type MAC header message can be selectively used as the 'Bandwidth Request and Downlink Burst Profile Change Request Header' message in the following description with reference to FIG. 5.

Figure 5:
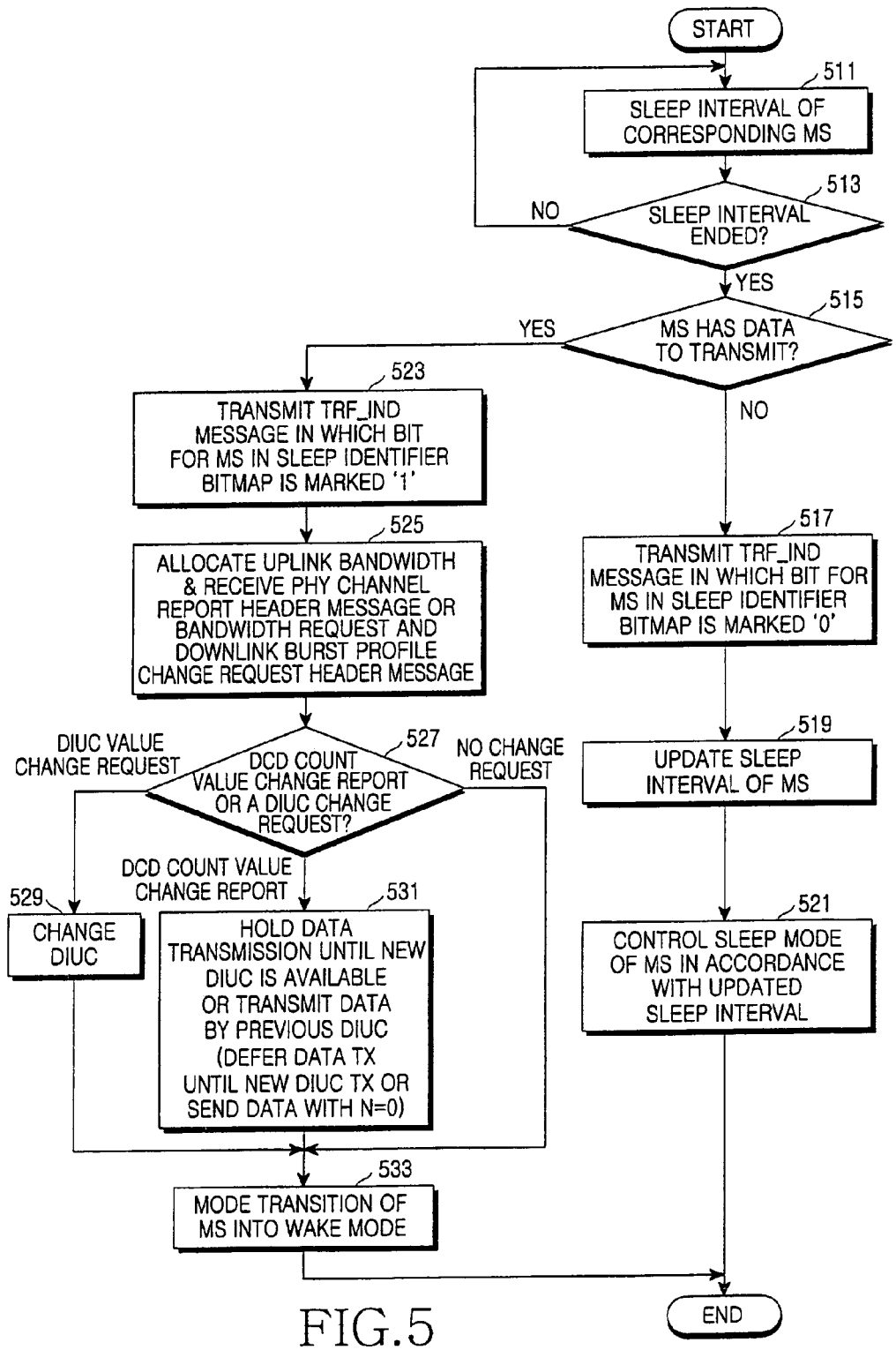
FIG. 5 is a flowchart of an operation process by a BS in an IEEE 802.16e communication system according to an embodiment of the present invention.

FIG. 5 is a flowchart of an operation process by a BS in an IEEE 802.16e communication system according to an embodiment of the present invention. Referring to FIG. 5, while a corresponding MS controlled by the BS is in the sleep mode in step 511, the BS checks if the sleep interval of the corresponding MS terminates in step 513. When the sleep interval has not terminated yet, the BS returns to step 511.

When the sleep interval of the MS has terminated, the BS proceeds enters a listening interval. In step 515, the BS inspects if data targeting the corresponding MS, i.e., data to be transmitted to the MS, is stored in a buffer. When there is no data to be transmitted to the MS, the BS proceeds to step 517.

In step 517, the BS transmits a TRF_IND message after marking the bit for the corresponding MS in the sleep identifier bitmap of the TRF_IND message by a value representing a negative indication, i.e., '0', and then proceeds to step 519. In step 519, the BS updates the sleep interval of the corresponding MS, and in step 521, the BS controls the MS in the sleep mode based on the updated sleep interval.

As a result of the inspection in step 515, when there is data to be transmitted to the MS, the BS transmits a TRF_IND message after marking the bit for the corresponding MS in the sleep identifier bitmap of the TRF_IND message by a value representing a positive indication, i.e., '1', in step 523.

In step 525, the BS allocates an uplink bandwidth to the corresponding MS, and receives through the allocated uplink bandwidth one MAC header message from among the first type MAC header message, i.e., PHY channel report header message, and the second and third type MAC header messages, i.e., Bandwidth Request and Downlink Burst Profile Change Request Header messages. In step 525, the BS obeys the determination of the IEEE 802.16e communication system in receiving one of the first, second, and third type MAC header messages.

In step 527, the BS determines, based on an analysis of the first, second, or third type MAC header message received from the MS, if there is a DCD count value change report or a DIUC change request. When there is a DIUC change request, the BS changes the DIUC according to the request of the MS in step 529.

As a result of the determination in step 527, when there is a DCD count value change report, the BS transmits a data to MS based on the DIUC of the downlink burst profile of the DCD message corresponding to the DCD count value currently stored in the MS or holds the data transmission until the BS transmits the DCD message to the MS in step 531.

When there is neither a DCD count value change report nor a DIUC change request as a result of the determination in step 527, the BS proceeds directly to step 533.

In step 533, the BS controls the MS to transit into an awake mode and then terminates the process.

According to the present invention, when a DCD message changes, i.e., when a downlink burst profile changes, in a sleep mode of a broadband wireless access communication system using an OFDM/OFDMA scheme, e.g., an IEEE 802.16e communication system, or when it is necessary to change the DIUC of the MS due to the change in the CINR of the MS, the MS reports the change of the DCD message and requests the change of the DIUC from the BS, in order for the BS and the MS to transmit and receive data with the same DIUC, thereby maximizing the transmission efficiency.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting and receiving a signal by a mobile station in a broadband wireless access communication system, the method comprising the steps of:
   receiving, from a base station, a downlink MAP message including a first change count of a downlink channel description; and
   comparing the first change count of the downlink channel description with a stored change count of the downlink channel description received prior to the first change count of the downlink channel description;
   measuring a carrier to interference and noise ratio (CINR) of a downlink signal from the base station; and
   transmitting, to the base station, a header message in order to request bandwidth and change of a downlink burst profile,
   wherein the header message includes bandwidth request information, the measured CINR, and the compared result indicating whether the first change count of the downlink channel description is equal to the stored change count of the downlink channel description.

2. The method as claimed in claim 1, wherein the downlink burst profile includes downlink channel information including a set of information about modulation schemes and coding schemes to be applied to a downlink channel.

3. The method as claimed in claim 1, wherein the header message includes at least one of type information indicating a type of the header message, a connection identifier of the mobile station, and a header check sequence.

4. A method for transmitting and receiving a signal by a base station in a broadband wireless access communication system, the method comprising the steps of:
   receiving, from a mobile station, a header message requesting bandwidth and change of a downlink burst profile, the header message including bandwidth request information, a measured earner to interference and noise ratio (CLNR) of a downlink signal from a base station, and a compared result indicating whether a first change count of the downlink channel description included in a downlink MAP message is equal to a stored change count of the downlink channel description received prior to the first change count of the downlink channel description; and
   matching the downlink burst profile of the base station and the mobile station with each other when the compared result indicates that the first change count of the downlink channel description is not equal to the stored change count of the downlink channel description.

5. The method as claimed in claim 4, wherein the downlink burst profile comprises downlink channel information including a set of information about modulation schemes and coding schemes to be applied to a downlink channel.

6. The method as claimed in claim 4, wherein the header message includes at least one type information indicating a type of the header message, a connection identifier of the mobile station, and a header check sequence.

7. An apparatus for transmitting and receiving a signal in a broadband wireless access communication system, the apparatus comprising:
   a base station; and
   a mobile station for receiving, from the base station, a downlink MAP message including a first change count of a downlink channel description, comparing the first change count of the downlink channel description with a stored change count of the downlink channel description received prior to the first change count of the downlink channel description, measuring a carrier to interference and noise ratio (CINR) of a downlink signal from the base station, and transmitting, to the base station, a header message in order to request bandwidth and change of a downlink burst profile,
   wherein the header message includes bandwidth request information, the measured CINR, and the compared result indicating whether the first change count of the downlink channel description is equal to the stored change count of the downlink channel description.

8. The apparatus as claimed in claim 7, wherein the downlink burst profile comprises downlink channel information including a set of information about modulation schemes and coding schemes to be applied to a downlink channel.

9. The apparatus as claimed in claim 7, wherein the header message includes at least one of type information indicating a type of the header message, a connection identifier of the mobile station, and a header cheek sequence.

10. An apparatus for transmitting and receiving signal in a broadband wireless access communication system, the apparatus comprising:
    a mobile station; and
    a base station for receiving, from the mobile station, a header message requesting bandwidth and change of a downlink burst profile, the header message including bandwidth request information, a measured carrier to interference and noise ratio (CINR) of a downlink signal from a base station, and a compared result indicating whether a first change count of a downlink channel description included in a downlink MAP message is equal to a stored change count of the downlink channel description received prior to the first change count of the downlink channel description, and matching downlink burst profile of the base station and the mobile station with each other when the compared result indicates that the first change count of the downlink channel description is not equal to the stored change count of the downlink channel description.

11. The apparatus as claimed in claim 10, wherein the downlink burst profile comprises downlink channel information including a set of information about modulation schemes and coding schemes to be applied to a downlink channel.

12. The apparatus as claimed in claim 10, wherein the header message includes at least one type information indicating a type of the header message, a connection identifier of the mobile station, and a header check sequence.

* * * * *